US010635401B2

(12) United States Patent
Hinterstoisser et al.

(10) Patent No.: US 10,635,401 B2
(45) Date of Patent: Apr. 28, 2020

(54) METHOD FOR OPTIMAL ARRANGEMENT OF A RANDOM NUMBER GENERATOR

(71) Applicant: Siemens Aktiengesellschaft, Munich (DE)

(72) Inventors: Thomas Hinterstoisser, Bisamberg (AT); Martin Matschnig, Tulln (AT); Herbert Taucher, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 66 days.

(21) Appl. No.: 15/997,955

(22) Filed: Jun. 5, 2018

(65) Prior Publication Data

US 2018/0349099 A1 Dec. 6, 2018

(30) Foreign Application Priority Data

Jun. 6, 2017 (EP) .................................. 17174513

(51) Int. Cl.
*G06F 7/58* (2006.01)

(52) U.S. Cl.
CPC .................................. *G06F 7/588* (2013.01)

(58) Field of Classification Search
CPC ...................................................... G06F 7/588
USPC .............................................. 708/250–256
See application file for complete search history.

(56) References Cited

U.S. PATENT DOCUMENTS

| 8,805,906 B2* | 8/2014 | Vergnes | G06F 7/584 |
| | | | 708/250 |
| 9,075,674 B2* | 7/2015 | Tkacik | G06F 7/58 |
| 9,436,436 B2* | 9/2016 | Humble | G06F 7/588 |
| 2009/0106338 A1* | 4/2009 | Dunbar | G06F 7/586 |
| | | | 708/251 |
| 2009/0110188 A1 | 4/2009 | Dolgunov et al. | |

OTHER PUBLICATIONS

Majzoobi et al; "FPGA-Based True Random Number Generation Using Circuit Metastability with Adaptive Feedback Control"; Cryptographic hardware and embedded systems A ches 2011, Springer Berlin Heidelberg; pp. 17-32; ISBN: 978-3-642-23950-2; XP019166873; 2011.

(Continued)

*Primary Examiner* — Tan V Mai
(74) *Attorney, Agent, or Firm* — Cozen O'Connor

(57) ABSTRACT

A method for optimal arrangement of a random generator on an electronic component, which includes a programmable integrated circuit and a basic structure consisting of a plurality of basic blocks, wherein during an initialization phase, starting from a starting configuration for a respective current arrangement of the random generator, the following are performed with a predefined number of repetitions, i.e., a predefined test sequence is performed for the current arrangement of the random generator, a test result is forwarded to a reconfiguration module and the current arrangement on the electronic component is reconfigured via the reconfiguration module, where upon each repetition, the test result of the current arrangement of the random generator is compared with the test result of a previous arrangement, and the current arrangement is saved in the reconfiguration module, if the test result for the current arrangement has a better test result than the previous arrangement.

14 Claims, 2 Drawing Sheets

(56) References Cited

OTHER PUBLICATIONS

Dan Hotoleanu et al: "Real-Time Testing of True Random Number Generators Through Dynamic Reconfiguration", 13th Euromicro Conference on Digital System Design: Architectures, Methods and Tools; Sep. 1-3, 2010, Lille, France, IEEE, US, Seiten 247-250, XP031785175, ISBN: 978-1-4244-7839-2 *Abschnitte !-III *; 2010.
Deak Norbert et al: "Highly Efficient True Random Number Generator in FPGA Devices Using Phase-Locked Loops", 2015 20th International Conference on Control Systems and Computer Science, IEEE, Seiten 453-458, XP033187931, DOI: 10.1109/CSCS. 2015.19 [gefunden am Jul. 27, 2015] * Abschnitt II, III zweiter Paragraph, IV A, C, F *; 2015.

* cited by examiner

METHOD FOR OPTIMAL ARRANGEMENT OF A RANDOM NUMBER GENERATOR

BACKGROUND OF THE INVENTION

1. A Field of the Invention

The present invention generally relates to the field of electronic systems and circuits, in particular programmable, integrated circuits such as Field Programmable Gate Arrays (FPGAs), for instance, and more specifically, to a method for the optimal arrangement of a random generator, in particular a hardware random generator, on an electronic component, where the electronic component, upon which the random generator is realized, comprises a programmable integrated circuit, in particular a Field Programmable Gate Array (FPGA), and includes a basic structure consisting of a plurality of basic blocks, and also relates to an associated arrangement of a random generator, in particular a hardware random generator.

2. Description of the Related Art

In security-relevant applications, such as in cryptography applications, authentication methods, or encryption methods, random bit sequences are frequently used in the form of binary random numbers. In order to generate a random bit sequence, random generators are typically used, where in order to generate random numbers, pseudo-random number generators and/or physical or hardware random generators, also known as true random number generators (TRNG), are used, for example.

In the case of pseudo-random generators or deterministic random number generators, random bits are generated algorithmically. This means that the generated random bits are not truly random, but rather deterministic, yet have similar statistical properties to true random numbers. For a calculation of random numbers, use is made of starting values, i.e., "seeds"; which are typically generated from another random source. To this end, true random numbers are frequently used, which are supplied by a hardware random generator.

Physical or hardware random generators, which are also known as true random number generators (TRNG), are important, essential component units in security-relevant applications. They are typically used in order to generate random numbers with a higher entropy or high quality (i.e., with a low predictability). Hardware random generators are therefore used in security-relevant applications, for generating secret and/or public keys in encryption methods, for example, and as initialization vectors (i.e., "seeds") for various cryptographic functions or pseudo-random generators.

For hardware random generators, a physical process typically serves as a random source. The physical process (e.g., radioactive decay, thermal noise of semiconductors, or free running oscillators) is detected via sensors, for example, and the random bits or random numbers are subsequently extracted from the measured data. Hardware random generators of this kind, for example, have considerable disadvantages, such as elaborate measuring apparatuses for observing the respective physical variable, influencing the operating principle by, e.g., external influences, or aging. Attempts have therefore been made to realize hardware random generators via electronic circuits in particular via Field Programmable Gate Arrays (FPGAs).

FPGAs are in the field of application of programmable logic gate arrays, which in principle are used in a flexible manner and can be reprogrammed. Here, basic blocks are programmed or interconnected accordingly in order to execute desired functions or model desired circuit structures, where these various circuit structures and functions can be realized by configuring the basic blocks. When realizing a hardware random generator via FPGAs, different mechanisms and/or physical effects can be exploited in the reprogrammable FPGA logic, for example. One frequently used realization variant of a hardware random generator via an FPGA is based, for example, on ring oscillators, e.g., as known from the publication DE 10 2008 048 292 A1.

Although production of digitally implemented hardware random generators as programmable electronic circuits, in particular as FPGAs, can be effected in a favorable manner, disruptions in the process of the random number generation may arise on account of production fluctuations in the respective electronic components, where the disruptions negatively influence the entropy or the quality of the generated random numbers. The entropy, as a measure for a quantity of random information in an information sequence or random number sequence, may thus also represent a measure for the quality of the random numbers generated by the random generator. In particular, the entropy of the generated random numbers may also depend on an actual and final arrangement of the random generator within the FPGA structure or on the respective electronic component. Primarily, when realizing the hardware random generator based on a large number of ring oscillators, the physical arrangement of the hardware random generator on the respective electronic component or within the FPGA structure can significantly influence the entropy and therefore the quality of the random numbers.

In order to estimate the quality of a random generator implemented within an FPGA structure, mechanisms for verifying the generated random numbers may be included during the runtime, for example, during a design phase of the hardware random generator. With these mechanisms, for example, the quality of the generated random numbers can be checked continuously, in order to be able to implement corresponding measures (e.g., post-processing of the random numbers, or alarm message) immediately from a system side, e.g. during the use/operation of the FPGA. Furthermore, for example, algorithmic post-processing can be performed to compensate for statistical defects in the generated random numbers and to increase the entropy of the generated random numbers. In addition or as an alternative, for example, cryptographically strong hash functions may be used to offset fluctuations in the frequency distribution. These disclosed measures for offsetting production fluctuations in the electronic components or for improving the entropy of the random numbers, however, lead to additional effort and costs, such as during the design, implementation and operation of the hardware random generator. Furthermore, primarily production fluctuations of the electronic components or in the FPGA structure (primarily with high production quantities) can only be offset to a limited extent.

Alternatively, the quality of a hardware random generator can be checked by corresponding tests and the static evaluation thereof. To this end, for example, a fixed physical arrangement within the FPGA structure or on the electronic component is designated for the realization of the hardware random generator. Based on one or more individual FPGA components, the implemented hardware random generator is used to extract test patterns, for example, and statistical evaluations are then performed. Here, production fluctuations and an influence of the respective component or the respective specific FPGA structure on the entropy and quality of the generated random numbers, for example, can also only be recognized to a limited extent. If necessary, not all hardware random generators, the random numbers thereof have a low entropy due to individual component-specific fluctuations, are recognized, because the test patterns are dependent upon the selected components or FPGAs or realized hardware random generators.

SUMMARY OF THE INVENTION

In view of the foregoing, it is therefore an object of the present invention to provide a method for optimal arrangement of a hardware random generator, as well as an associated arrangement of the hardware random generator, which is realized via a programmable, digital, integrated circuit, in particular via a Field Programmable Gate Array (FPGA), where negative influences due to production fluctuations and due to variations in the digital, integrated circuit in terms of the quality or entropy of the generated random number sequences can be largely compensated in a simple manner.

This and other objects and advantages are achieved in accordance with the invention by a random generator arrangement, by a method of in which, during an initialization phase during production, starting from a starting configuration for a respective current arrangement of the random generator on the respective electronic component or within an FPGA basic structure, the following steps are performed with a predefined number of repetitions, i.e., performing a predefined test sequence with the respective current arrangement of the random generator, forwarding a test result to a reconfiguration module, and reconfiguring the respective current arrangement of the random generator on the electronic component or within the FPGA structure by way of the reconfiguration module.

Here, on each repetition, the test result of the respective current arrangement of the random generator is compared with the test result of a respective, previous arrangement of the random generator. The respective current arrangement of the random generator is then saved, if the test result for the respective current arrangement of the random generator has a better test result than the respective previous arrangement of the random generator. If the respective test result is worse than the test result of the previous arrangement of the random generator, then the respective current arrangement is discarded and the previous arrangement of the random generator remains stored, until a better test result is achieved or the number of predefined repetitions is reached by one of the subsequent arrangements of the random generator.

The main aspect of the solution proposed in accordance with the invention consists in an arrangement of the hardware random generator being able to be discovered during an initialization phase in production, which arrangement is optimal for the respective (individual) electronic component or FPGA, without manual interaction and with low outlay. Here, the arrangement of the hardware random generator is specifically optimized for the respective individual electronic component or the respective individual FPGA structure. That is, the method in accordance with the invention automatically determines an optimal arrangement of the random generator on the respective individual electronic component/within the respective individual FPGA structure and thus largely compensates for negative influences due to production fluctuations and variations in the respective component or the respective FPGA structure. This means that the negative influences on a quality of the random generator or the random numbers generated by the random generator are largely offset by the method in accordance with the invention or the specifically optimized arrangement of the random generator. The method in accordance with the invention thus makes it possible to generate sequences of random numbers with high entropy or quality within FPGA-based security applications, without a large outlay for tests and static evaluation and/or post-processing of the generated random numbers after production or during operation.

Here, it is recommended to use, as a test result, an entropy of the random numbers that have been generated using the respective current arrangement of the random generator on the electronic component. The entropy is a measure of a quantity of random information in an information or random number sequence and thus offers a statement regarding the quality of the random numbers or regarding the random generator, with which the respective random numbers have been generated. If an arrangement of the random generator on the electronic component has a higher entropy than a previous arrangement, then the random numbers generated therewith thus have greater random information and they are thus more difficult to guess, for example.

Furthermore, it is favorable if a test module, in which the predefined test sequence is hard-wire programmed, is used to perform the predefined test sequence. The test module may be loaded on the respective electronic component or in the respective FPGA basic structure and implemented there for the initialization phase during production. The test sequence which is then performed for the respective current arrangements of the random generator typically consists of a set of tests. One possible test sequence, for example, is what is known as the NIST Statistical Test Suite, which is described for instance in the publication D. Hotoleanu, O. Cret, A. Suciu, T. Gyorfi and L. Vacariu; "Real-Time Testing of True Random Number Generators Through Dynamic Reconfiguration", 2010, Euromicro Conference on Digital System Design: Architectures, Methods and Tools, pp. 247-250. The NIST Statistical Test Suite comprises 16 tests, for instance, where each test calculates a static value from a bit sequence, the value being compared with what is known as a significance level value. A qualitatively high-value random generator should pass all tests of the NIST Statistical Test Suite.

Ideally, at least one region of the electronic component or the physical FPGA basic structure consisting of basic blocks is reserved for the implementation of the random generator. This reserved region is only used for the implementation of logic of the hardware random generator. Ideally, the region reserved for the random generator is larger than the region that is necessary for actually implementing the random generator, such that different arrangements of the random generator on the electronic component can be tried and tested in a very simple manner. The region reserved for the random generator (optionally with an initial arrangement of the random generator) is also (as with the test module and the reconfiguration module as a starting configuration) loaded on the respective electronic component or in the respective FPGA basic structure for the initialization phase during production.

The reconfiguration of the respective current arrangement of the random generator during the initialization phase in production is undertaken by the reconfiguration module. In this context, the respective current arrangement of the basic blocks, by way of which the random generator is represented, is adjusted or changed by the reconfiguration module autonomously and dynamically. This means that the respective FPGA configuration of the basic block region reserved for the random generator is reprogrammed by the reconfiguration module directly. In so doing, an internal partial reconfiguration mechanism such as the so-called Dynamic Partial Reconfiguration or DPF application is advantageously used, with which it is possible to implement a plurality of temporally exclusive functions on the same physical component surface or FPGA surface. Based on a response or the forwarding of the test results for the random generator arrangement of the test module at this current time, a new random generator arrangement is then loaded in the reserved region as the current arrangement to be tested for the random generator. The reconfiguration of the respective current arrangement of the random generator by the reconfiguration module can then be performed according to the random principle.

Alternatively, however, the reconfiguration of the respective current arrangement of the random generator may also be performed by systematic permutation of the basic blocks of the region reserved for the implementation.

In an advantageous embodiment of the invention, when the initialization phase is concluded, the arrangement of the random generator currently stored in the reconfiguration module is forwarded to a synthesis unit, where the conclusion of the initialization phase for the respective electronic component or FPGA can be triggered by the predefined number of repetitions of the method steps being reached. The number of repetitions can be predefined, for instance, as a starting parameter for the initialization phase. A synthesis phase, in which a configuration file for the complete design of the respective electronic component or FPGA is created, then follows the initialization phase. Here, the optimal arrangement of the random generator discovered for the respective electronic component during the initialization phase is used and an electronic component with the corresponding random generator arrangement is created.

It is also an object of the invention to provide an arrangement of a random generator which is implemented on an electronic component comprising a programmable integrated circuit, in particular a Field Programmable Gate Array (FPGA), and which can be created by the method in accordance with the invention. In this arrangement, all the basic blocks of the basic structure of the component or the FPGA that belong to the random generator are linked to the basic block positions which have been determined as the optimal arrangement for the random generator by the method according to the invention. All other basic blocks in the region of the electronic component or FPGA at least reserved for the random generator remain unused, in order to avoid influencing the behavior of the random generator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described making reference to the accompanying figures, in which.

DETAILED DESCRIPTION OF THE EXEMPLARY EMBODIMENTS

Figure 1:
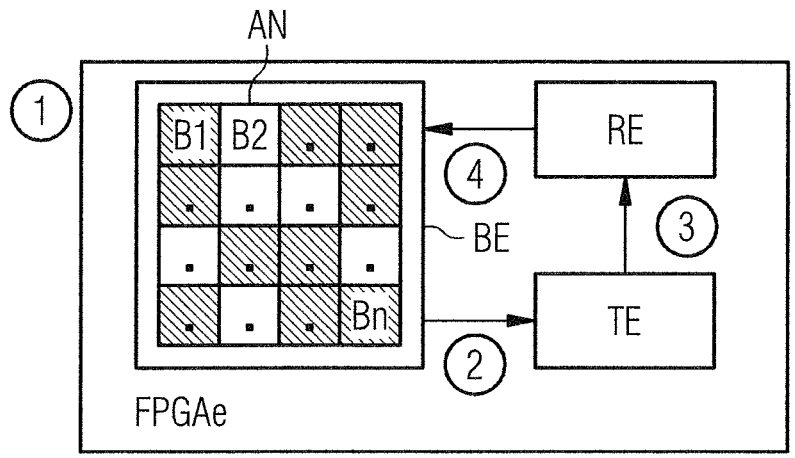
FIG. 1 shows a schematic representation of an exemplary process of the method in accordance with the invention for optimal arrangement of a random generator on an exemplary electronic component during an initialization phase.

FIG. 1 shows schematically an exemplary electronic component FPGAe during an initialization phase, which is introduced for each electronic component FPGAe in a production process. The electronic component FPGAe comprises, for example, a Field Programmable Gate Array (FPGA) and has a basic structure that also consists of a plurality of basic blocks B1, B2, . . . , Bn, which are represented by way of example in a region BE.

A logic circuit or a circuit arrangement comprising at least one random generator, primarily a hardware random generator or a True Random Number Generator (TRNG), should be implemented on the electronic component FPGAe during the production process. Here, by way of the method in accordance with the invention an optimal arrangement TRNG for a hardware random generator is determined during the initialization phase in production.

To this end, in a first method step 1, a starting configuration for the initialization phase is loaded on the electronic component FPGAe or in the basic structure of the component FPGAe. This starting configuration comprises at least one test module TE for performing a predefined test sequence for random generators or for assessing a quality of the generated random numbers, such as what is known as NIST Statistical Test Suite. This predefined test sequence is hard-wire programmed in the test module TE, for example. Furthermore, the starting configuration has a reconfiguration module RE, with which the respective current arrangement AN of the random generator on the electronic component FPGAe can be reconfigured. A region BE of the electronic component FPGAe is reserved for an implementation of the respective current arrangement AN of the random generator. The region BE consists of basic blocks B1, B2, . . . , Bn and is larger than a region which is occupied by logic of the random generator, such that different arrangements AN can be tested. Basic blocks B1, B2, . . . , Bn used by the respective current arrangement AN by way of example are thus shaded in FIG. 1 and the basic blocks B1, B2, . . . , Bn not used by the respective current arrangement AN are shown in white. Furthermore, in the first method step 1, a number of times for the following method steps 2 to 4 to be repeated is predefined as a starting parameter and a starting arrangement AN for the random generator in the reserved region BE is loaded.

In a second method step 2, the predefined test sequence is then performed by the test module TE for the respective current arrangement AN of the random generator implemented in the region BE. This test sequence means that an entropy or a quality of the random numbers generated via the current random generator arrangement AN can be estimated or assessed, for instance. In a third method step 3, the test results for the respective current arrangement AN of the random generator are then forwarded to the reconfiguration module RE by the test module TE.

In the fourth method step 4, on the one hand, the respective current arrangement AN of the random generator, which is implemented in the reserved region BE or on the electronic component FPGAe, is reconfigured by the reconfiguration module RE, wherein the respective configuration of the basic blocks B1, B2, . . . , Bn of the region BE reserved for the random generator is reprogrammed directly by the reconfiguration module RE. To this end, for instance, a Dynamic Portal Reconfiguration or DPE application is used by the reconfiguration module RE as the internal reconfiguration mechanism. Here, the reconfiguration of the respective current arrangement AN of the random generator may either be performed in accordance with the random principle or by systematic permutation of the basic blocks B1, B2, . . . , Bn reserved for the implementation of the random generator.

Based on the test result forwarded by the test module TE, the new current arrangement AN of the random generator in the region BE of the electronic component FPGAe reserved for the random generator is then loaded and method steps 2 to 4 are performed repeatedly until the number of repetitions predefined in the first method step 1 has been reached. On each repetition of method steps 2 to 4, the test result of the respective current arrangement AN of the random generator is compared with the test result of the previous arrangement of the random generator at the fourth method step 4 in the reconfiguration module RE. If the test result of the current arrangement AN of the random generator is better than the test result of the previous arrangement, then the current arrangement AN of the random generator is stored in the reconfiguration module RE. If the current arrangement AN of the random generator has a worse test result than the previous arrangement, then the current arrangement AN of the random generator is discarded, until an optimal arrangement TRNG for the random generator on the electronic component FPGAe is stored in the reconfiguration module RE when the predefined number of repetitions is reached, where the arrangement has the best test result of all arrangements AN tested during the repetitions of method steps 2 to 4. This means that the random numbers generated via the arrangement TRNG of the random generator have the highest entropy or quality. When the predefined number of repetitions is reached, the initialization phase for the respective electronic component FPGAe is also concluded.

Figure 2:
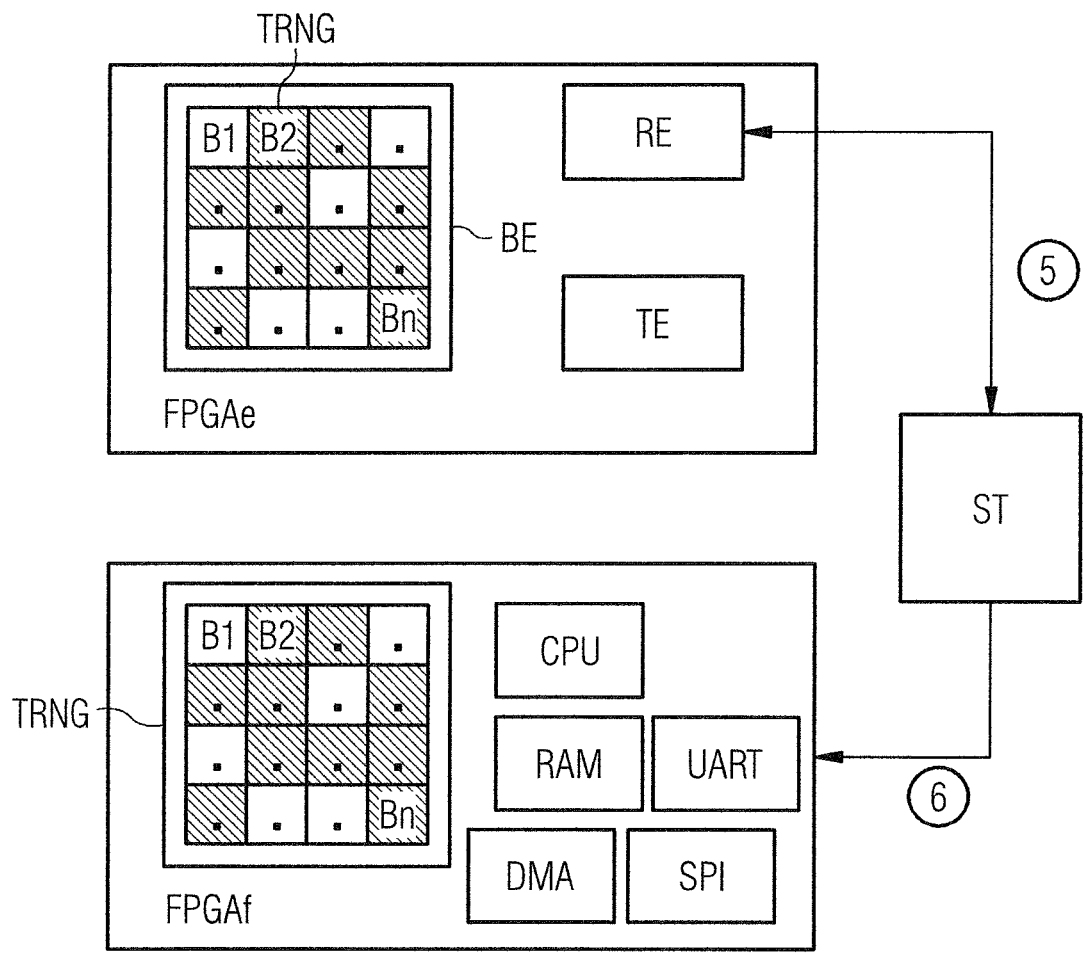
FIG. 2 shows a schematic and exemplary representation of a transition from the initialization phase to a synthesis phase for designating a final design of the exemplary electronic component in accordance with the invention.

A transition from the initialization phase to a synthesis phase, in which a final design FPGAf of the exemplary electronic component FPGAe is designated, is represented in FIG. 2 in a schematic and exemplary manner. Once again, FIG. 2 shows the electronic component FPGAs at the end of the initialization phase, which once again comprises at least the test module TE, the reconfiguration module RE, in which the optimal arrangement TRNG of the random generator is stored, and the optimal arrangement TRNG of the random generator in the reserved region BE. In the optimal arrangement TRNG of the random generator, the basic blocks B1, B2, . . . , Bn used for the random generator are again shaded and unused basic blocks B1, B2, . . . , Bn are again shown in white.

At the end of the initialization phase during production, the optimal arrangement TRNG of the random generator stored in the reconfiguration module RE is then read out in a fifth method step 5 and forwarded to a synthesis unit ST. The initialization phase is followed by a synthesis phase, in which a configuration file for a complete design FPGAf for the respective electronic component FPGAe is created. In a sixth method 6, the electronic component FPGAe is then configured accordingly with the final design FPGAf with the aid of the configuration file, or the component FPGAe is converted into the final design of the component FPGAf. Here, the optimal arrangement TRNG of the random generator discovered for the respective electronic component FPGAe during the initialization phase is then implemented alongside further functional modules CPU, RAM, UART, DMA, SPI illustrated by way of example. This means that those basic blocks B1, B2, . . . , Bn of the random generator TRNG on the component FPGAe or of the final design FPGAf are linked to those basic block positions B1, B2, . . . , Bn discovered for the optimal arrangement TRNG during the initialization phase, where the positions or basic blocks B1, B2, . . . , Bn of the final design FPGAf of the electronic component FPGAe are likewise represented as shaded in FIG. 2. All other basic block positions B1, B2, . . . , Bn of the region BE reserved for the random generator TRNG remain unused in the final design FPGAf of the electronic component FPGAe, in order to avoid influencing the behavior of the random generator TRNG. The unused basic blocks B1, B2, . . . , Bn are also represented in white in FIG. 2 in the final design of component FPGAf.

By way of the method in accordance with the invention, component-specific random generators TRNG can be discovered automatically and without manual interaction, with which sequences of random numbers with high entropy or quality are generated. The optimal arrangement TRNG of the random generator individually adjusted to the respective component FPGAe means that negative influences of production fluctuations and variations in the electronic component FPGAe on the quality of the random numbers can be offset without great outlay.

Figure 3:
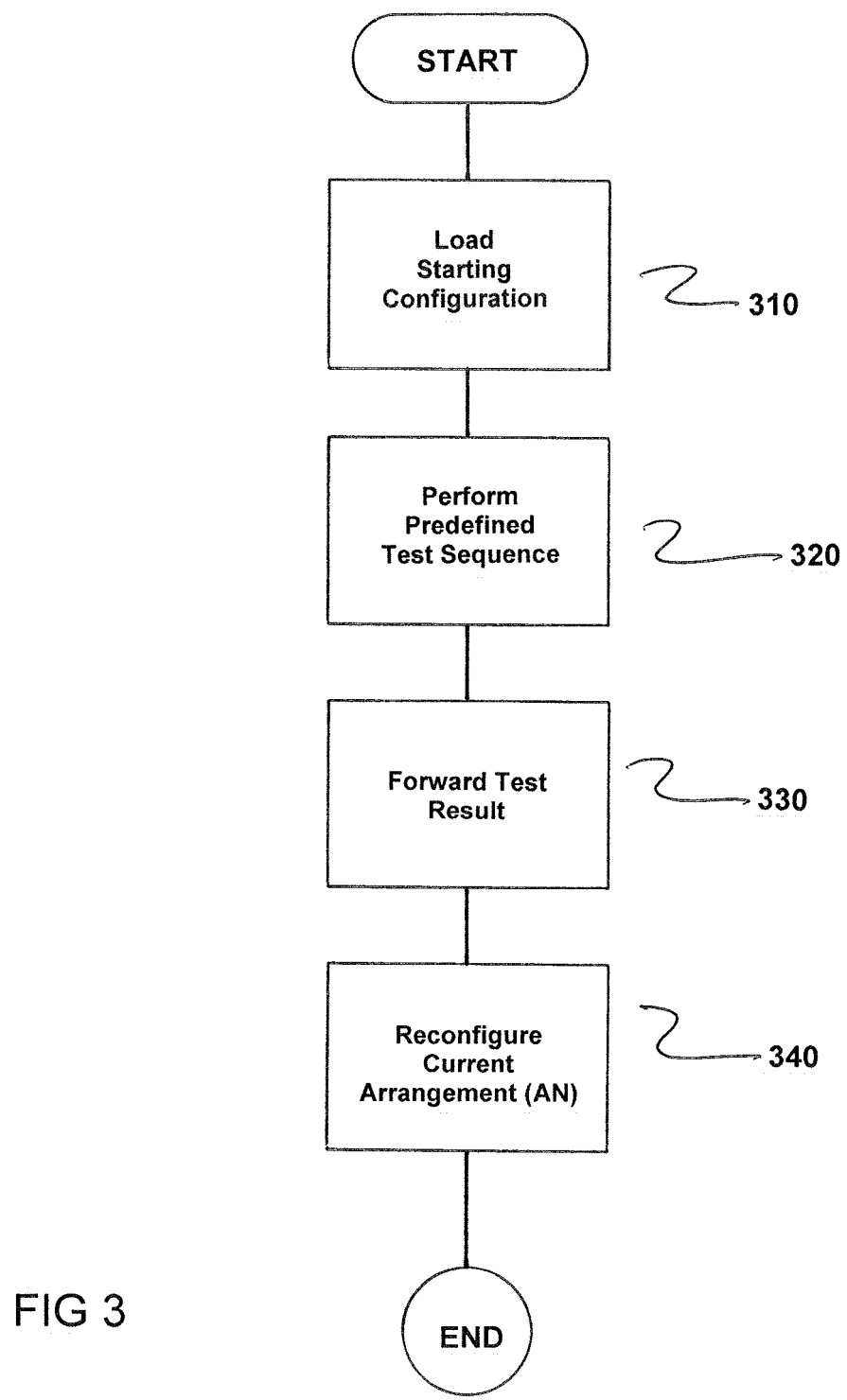
FIG. 3 is a flowchart of the method in accordance with the invention.

FIG. 3 is a flowchart of the method for optimal arrangement of a random generator on an electronic component FPGAe, where the electronic component FPGAe, upon which the random generator is realized, comprises a programmable integrated circuit, in particular a Field Programmable Gate Array FPGA, and includes a basic structure consisting of a plurality of basic blocks B1, B2, . . . , Bn. The method comprises loading a starting configuration for an initialization phase onto the electronic component FPGAe or in the basic structure of the component FPGAe, as indicated in step 310.

Next, during the initialization phase and starting from the starting configuration for a respective current arrangement of the random generator on the respective electronic component (FPGAe), a predefined test sequence with the respective current arrangement (AN) of the random generator (2) is performed with a predefined number of repetitions, as indicated in step 320.

Next, during the initialization phase, starting from the starting configuration for the respective current arrangement of the random generator on the respective electronic component (FPGAe), a test result is forwarded to a reconfiguration module (RE, 3) with the predefined number of repetitions, as indicated in step 330.

Next, during the initialization phase, starting from the starting configuration for the respective current arrangement of the random generator on the respective electronic component (FPGAe), the respective current arrangement (AN) of the random generator on the electronic component (FPGAe) is reconfigured via the reconfiguration module (RM, 4) with the predefined number of repetitions, as indicated in step 340. Here, upon each repetition, if the test result for the respective current arrangement AN of the random generator has a better test result than the respective previous arrangement of the random generator, then the test result of the respective current arrangement AN of the random generator is compared with the test result of a respective previous arrangement of the random generator and the respective current arrangement of the random generator is saved.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for optimal arrangement of a random generator realized on an electronic component comprising a programmable integrated circuit and including a structure consisting of a plurality of basic blocks, the method comprising:
    performing, during an initialization phase and starting from a starting configuration for a respective current arrangement of the random generator on the respective electronic component, a predefined test sequence with the respective current arrangement of the random generator with a predefined number of repetitions;
    forwarding, during the initialization phase and starting from the starting configuration for the respective current arrangement of the random generator on the respective electronic component, a test result to a reconfiguration module with the predefined number of repetitions; and
    reconfiguring, during the initialization phase and starting from the starting configuration for the respective current arrangement of the random generator on the respective electronic component, the respective current arrangement of the random generator on the electronic component via the reconfiguration module with the predefined number of repetitions;
    wherein, upon each repetition, the test result of the respective current arrangement of the random generator is compared with the test result of a respective previous arrangement of the random generator and the respective current arrangement of the random generator is then saved, if the test result for the respective current arrangement of the random generator has a better test result than the respective previous arrangement of the random generator.

2. The method as claimed in claim 1, wherein an entropy of random numbers which are generated utilizing the respective current arrangement of the random generator on the electronic component is used as the test result.

3. The method as claimed in claim 2, wherein a test module, in which the predefined test sequence is hard-wire programmed, is utilized to perform the predefined test sequence.

4. The method as claimed in claim 1, wherein a test module, in which the predefined test sequence is hard-wire programmed, is utilized to perform the predefined test sequence.

5. The method as claimed in claim 1, wherein at least one region of the electronic component consisting of basic blocks is reserved for an implementation of the random generator.

6. The method as claimed in claim 1, wherein a Dynamic Portal Reconfiguration application is utilized by the reconfiguration module to reconfigure the respective current arrangement of the random generator.

7. The method as claimed in claim 1, wherein the reconfiguration of the respective current arrangement of the random generator is performed by the reconfiguration module in accordance with a random principle.

8. The method as claimed in claim 1, wherein the reconfiguration of the respective current arrangement of the random generator is performed by the reconfiguration module based on systematic permutation of the basic blocks of the region reserved for the implementation.

9. The method as claimed in claim 1, wherein an arrangement of the random generator currently stored in the reconfiguration module is forwarded to a synthesis unit when the initialization phase concludes.

10. The method as claimed in claim 1, wherein the programmable integrated circuit is a Field Programmable Gate Array.

11. An arrangement of a random generator, which is implemented on an electronic component comprising a programmable integrated circuit, wherein the arrangement is created by:
    performing during an initialization phase, starting from a starting configuration for a respective current arrangement of the random generator on the respective electronic component, a predefined test sequence with the respective current arrangement of the random generator with a predefined number of repetitions;
    forwarding during the initialization phase, starting from the starting configuration for the respective current arrangement of the random generator on the respective electronic component, a test result to a reconfiguration module with the predefined number of repetitions; and
    reconfiguring during the initialization phase, starting from the starting configuration for the respective current arrangement of the random generator on the respective electronic component, the respective current arrangement of the random generator on the electronic component via the reconfiguration module with the predefined number of repetitions;
    wherein, upon each repetition, the test result of the respective current arrangement of the random generator is compared with the test result of a respective previous arrangement of the random generator and the respective current arrangement of the random generator is then saved, if the test result for the respective current arrangement of the random generator has a better test result than the respective previous arrangement of the random generator.

12. The arrangement as claimed in claim 10, wherein the programmable integrated circuit is a Field Programmable Gate Array.

13. The method as claimed in claim 4, wherein at least one region of the electronic component consisting of basic blocks is reserved for an implementation of the random generator.

14. The method as claimed in claim 2, wherein at least one region of the electronic component consisting of basic blocks is reserved for an implementation of the random generator.

* * * * *